May 27, 1924.
B. O. CUDDIGAN
VEGETABLE LOADER
Filed Dec. 29, 1919
1,495,550
2 Sheets-Sheet 1
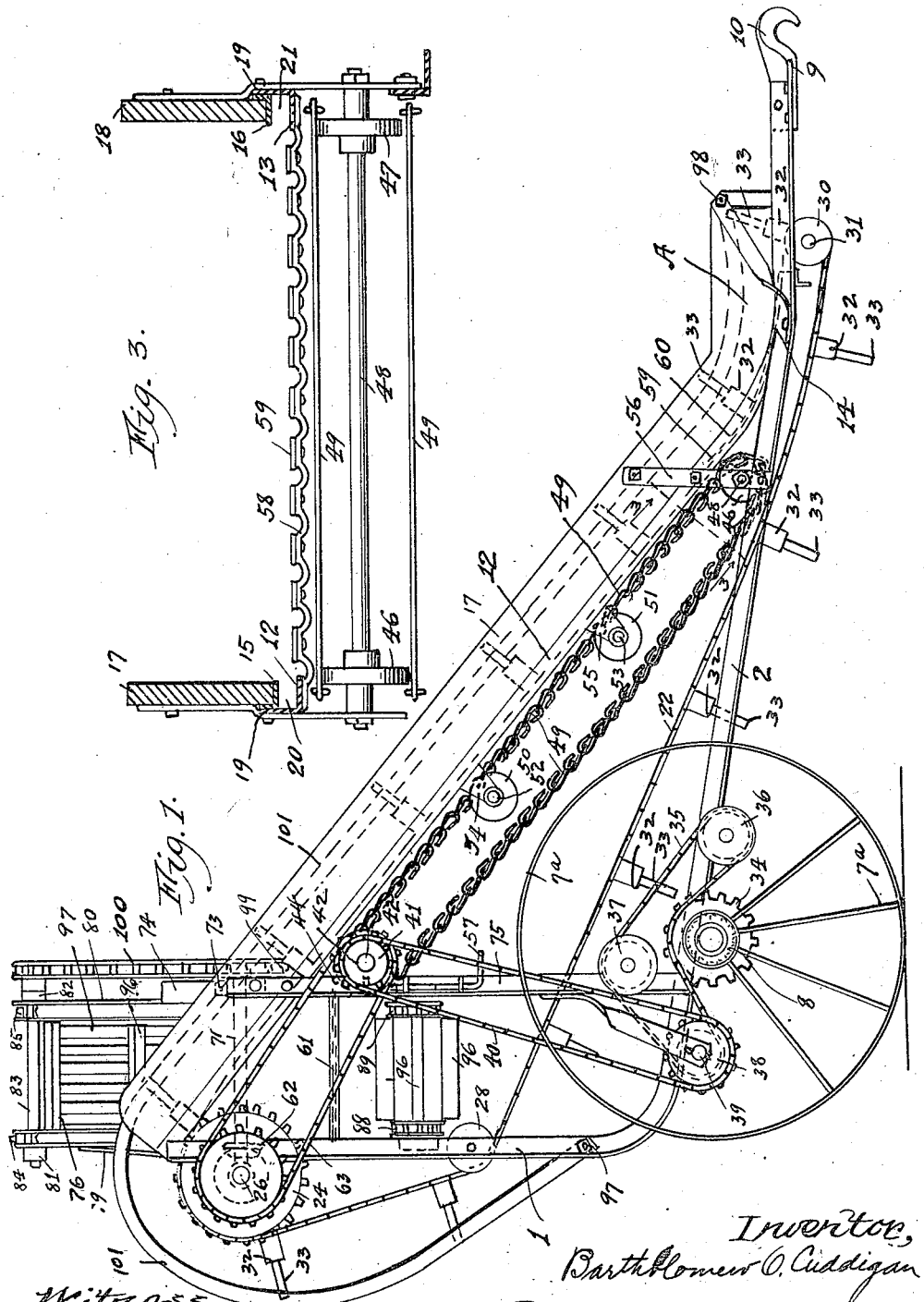

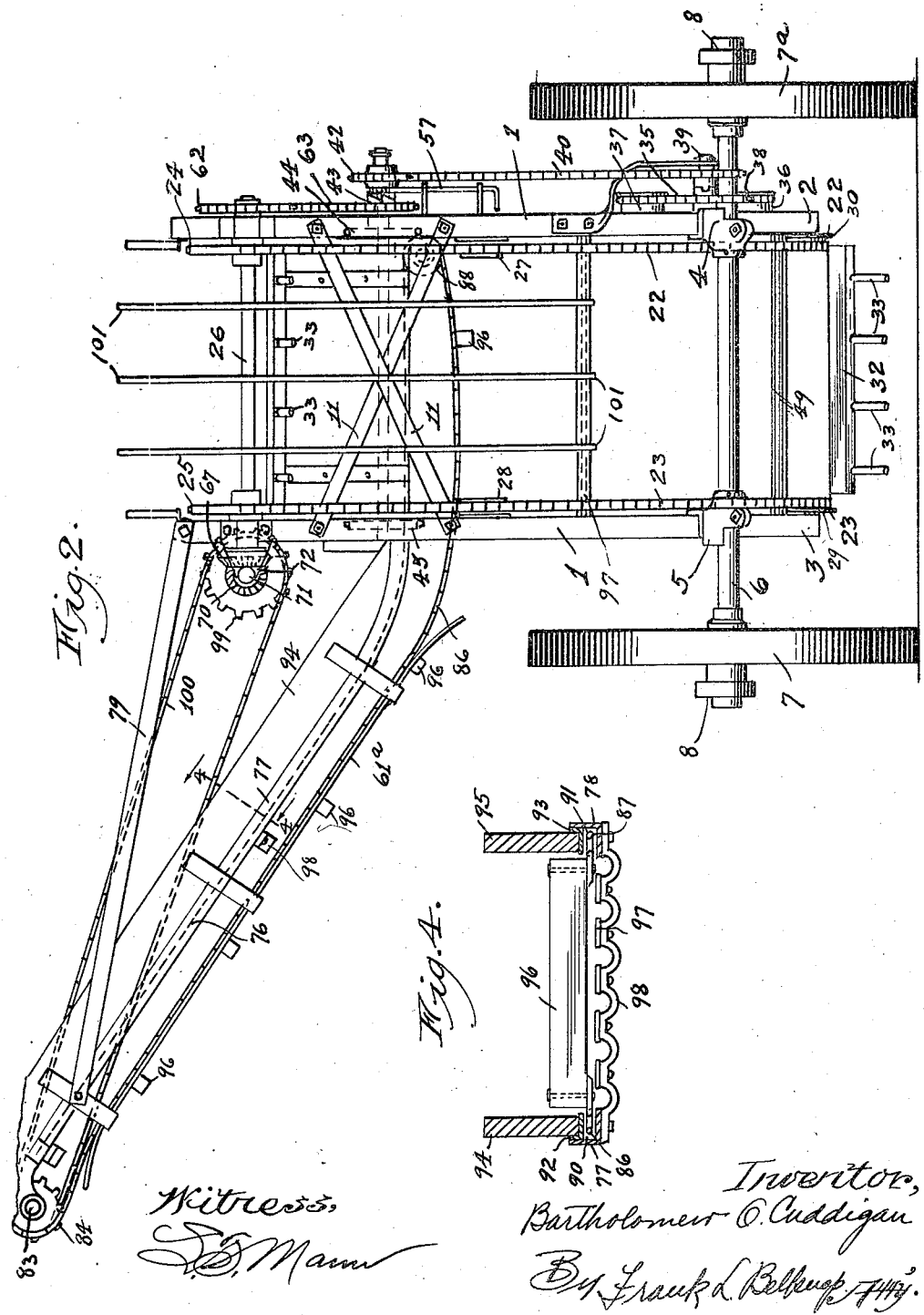

Patented May 27, 1924.

1,495,550

UNITED STATES PATENT OFFICE.

BARTHOLOMEW O. CUDDIGAN, OF WADENA, MINNESOTA, ASSIGNOR TO ROBERT M. EASTMAN, OF CHICAGO, ILLINOIS.

VEGETABLE LOADER.

Application filed December 29, 1919. Serial No. 347,999.

*To all whom it may concern:*

Be it known that I, BARTHOLOMEW O. CUDDIGAN, a citizen of the United States, residing in the city of Wadena, county of Wadena, and State of Minnesota, have invented certain new and useful Improvements in Vegetable Loaders, of which the following is a specification.

My invention relates to a machine for loading vegetables such as potatoes or the like and may be used in combination with any suitable type of digger whereby the vegetable products are delivered automatically to the loading machine where they are separated from the vines, or any adhering dirt and small stones, then conveyed to a cart or other receptacle.

Among its salient objects are to provide a strong, durable light weight machine that may be used with any type of vegetable digger; to provide a machine which effectively separates the dirt and vines from the vegetable, carrying off the vine by a separate chute than that conveying the vegetable and causing the dirt to drop from the vegetables and the vines through the conveyors; to provide a machine which has an endless screen-like elevator apron traveling below the elevator flights which carry the vines and somewhat faster than the vine flights, allowing the foreign material shaken from the vines to pass through and at the same time preventing the vegetables which are being conveyed upon the apron from being bruised by the vine flights; to provide a novel type of construction combining cheapness and a saving of power in operation and in general to provide a machine of the character referred to.

In the drawings:

Fig. 1 is a side elevation of the machine with parts omitted for clearness of illustration.

Fig. 2 is a rear end elevation with parts omitted and parts broken away.

Fig. 3 is a sectional detail taken on line 3—3 in Fig. 1, looking in the direction of the arrows.

Fig. 4 is a sectional detail taken on line 4—4 of Fig. 2, looking in the direction of the arrows.

Referring in detail to the drawings, 1 is the main frame which is of triangular construction and comprises the angular shaped base members 2 and 3, which are formed of angle iron and have provided thereon bearings 4 and 5 which are seated on the axle 6, upon which is rotatably mounted the ground wheels 7 and 7ª. The ground wheels are provided with ratchet hubs 8, of well known construction, which permit the axle to turn only when the machine is advancing and prevents reverse action of the mechanisms. The forward ends of the frame members 2 and 3 are bent inwardly and are riveted to a casting or forging 9 of A shape which terminates in the hook 10, whereby the machine is secured to any suitable type of digger (not shown).

The frame members 2 and 3 are turned upward at the rear of the machine and are cross-braced at 11 and have secured to their upper ends angle bars 12 and 13, which descend to the forward end of the machine and are riveted or otherwise secured with the forward extensions of the frame members 2 and 3, as shown at 14.

The angle bars 13 and 12 have similar bars 15 and 16 secured to their upper edges, which furnish supports for the side boards 17 and 18. These side boards, together with the angles 15 and 16 and the angle bars 12 and 13 are securely mounted by bolts or rivets 19 and the channels 20 and 21 are formed by the angle bars just described and provide ways for the endless chains 22 and 23, which travel over the sprocket wheels 24 and 25 on the shaft 26 and then down under the idlers 27 and 28, and up over the loose wheels 29 and 30 on the fixed shaft 31 at the forward end of the machine.

Upon the chains 22 and 23 are securely bolted at regular intervals wooden bars or flights 32, having wooden pegs or fingers 33. Fixedly secured with the axle 6 is a sprocket wheel 34, which transmits rotary motion through the endless chain 35, idlers 36 and 37 to the sprocket wheel 38 on the stub shaft 39. The purpose of this endless chain is to take up the road shocks. The sprocket 38 is interchangeable, making it possible to vary the speed of the mechanisms, according to soil conditions encountered in the field. The sprocket wheel 38 through the chain 40 drives the sprocket 41, which is loosely mounted upon the shaft 42. Upon this shaft are also fixedly mounted the sprockets 44, 45 and 43. The sprocket 43 has a clutch arrangement upon its hub, which cooperates with the clutch portion upon the hub of the sprocket 42 and provides means of connecting up the drive, which is taken from the ground wheels, with the operating mechanisms of the loader. This clutch mechanism is operated by means of the shifter 57.

Sprockets 44 and 45, combining with two lower idlers 46 and 47 mounted upon the shaft 48 carry the apron 49, which is supported in the bottom of the elevator chute by the sprockets and idlers at either end, together with the idlers 50 and 51, the latter being suitably mounted under the frames 12 and 13 on shafts 52 and 53 supported by brackets 54 and 55. Secondary supports 56 carry the shaft 48, on which the lower sprockets are mounted.

Corrugated cross bars 58 are bolted or riveted to the lower parts of the angle bars 12 and 13, and furnish supports for the slats 59 which are riveted or welded thereto and constitute the floor of the lower part of the elevator chute. It will be noted that this corrugated floor extends only a short way up the chute. At the top of this corrugated floor at 60, the chute is open-bottomed except for the screen-like apron 49, which travels upward over the sprockets and idlers as previously explained. This apron consists of a series of small iron rods which are bent to form a coarse screen and while allowing dirt or small stones to screen therethrough, it retains the vegetables and cooperating with the flights 32, conveys them into the hopper 61.

From the sprocket 43 is driven the sprocket 62 through the chain 63. The sprocket 62 is mounted upon a shaft 26, upon which are also mounted the sprockets 24 and 25 and bevel gear 67. Meshing with the bevel gear 67 is a bevel gear 70 on the cross shaft 71, which is mounted in bearings 72 and 73 on the frame member 3 and member 74, which together with member 75 furnishes supports for the cross conveyor 76. The cross conveyor comprises angle bars 77 and 78, secured with the angle bars 2 and 3, and the upright members 74 and 75 respectively, which angle bars are further held in place by the bars 79 and 80. At the outer extremities of the bars 77 and 78, is journalled in suitable bearings 81 and 82, a shaft 83, which has secured thereto sprockets 84 and 85. Upon the sprockets 84 and 85 are endless conveyor chains 86 and 87, which pass down upon the plate 61ª and then up over the idlers 88 and 89 and through the guide channels 90 and 91 formed by the angle bars 77 and 92 and the angle bars 78 and 93, thence to the sprockets 84 and 85. The angle bars 72, 92, 73 and 93 are bolted or otherwise secured to the side boards 94 and 95, which form the side walls of the conveyor chute. The conveyor chains have secured thereto at regular intervals, wooden cleats or flights 96 which cause the vegetables to advance over the slatted bottoms 97 secured to the corrugated bars 98. These bars are riveted or bolted to the angle bars 77 and 78.

Motion is transmitted to the conveyor chains by the connection with the shaft 71 through the sprocket wheels 99, chain 100 and sprocket wheels on the shaft 83.

In operation, the travel of the machine transmits a vibratory motion to the bars 101 which causes separation of the vegetables from the vines, also shaking loose any soil or other foreign substance and delivering the vegetables in a clean condition to the cross conveyor. As the vegetables are deposited on the forward end of the elevator at A, they are caried together with their vines upward by means of the cross flights or fingers, and after being shaken loose by the bars 101, the vegetables drop upon the apron 49 and are carried upward with it in its travel, being assisted by the cross flights. It will be noted that the sprockets driving the cross flights are somewhat larger than those driving the apron. Therefore, the apron will travel somewhat faster, thereby preventing bruising of the vegetables between the apron and the cross flights by moving the vegetables slightly faster than the cross bars which carry the vines.

In turning about or when the machine is in transit, it is desirable to disengage the operating mechanism by means of the clutch member, previously explained. The vegetables, after being deposited in the hopper 61 are fed along the slatted bottom 97 of the cross conveyor by means of the wooden cleats or cross bars 96, to any suitable collector, such as a farm wagon or cart (not shown).

By using this machine with a digger, the vegetables, after being dug, may be separated from their vines and any dirt or foreign substance adhering thereto. They may then be loaded onto a wagon in one operation, thus obviating the necessity of first digging, then separating them from their vines and finally loading them for transportation.

I claim as my invention:

1. In a machine of the character described, the combination with a frame of inclined vegetable shute attached thereto, said chute having an open bottom having substantially upright sides and channel members extending below said sides; endless driving members traveling in the channel members and spaced apart flights for elevating the vegetable vines bridging the endless driving members and moving therewith, an endless screenlike apron traveling in an upward direction, furnishing a bottom for the chute and elevating the vegetables which are separated from the vines and permitting the loose dirt to be screened therethrough.

2. In a vegetable loader, the combination with a main frame, of a traveling vegetable carrier, a traveling vine carrier and actuating mechanism for moving said carriers at different speeds relative to each other.

3. In a vegetable loader, the combination with a main frame of traveling vegetable carrier, a traveling vine carrier and actuating mechanism for moving said carriers at different speeds relative to each other, vibratory rods adapted to separate the vegetable from the vines while the latter are being transported on the traveling carrier.

4. In a vegetable loader, the combination with a main frame, of a traveling vegetable carrier comprising a screenlike apron, a traveling vine carrier consisting of two endless chains with bridging members or flights attached thereto, operative connection between both of said mechanisms and the ground wheels and means for operating them simultaneously at different speeds.

BARTHOLOMEW O. CUDDIGAN.